Sept. 1, 1964     V. I. MATKOVICH     3,147,076
PREPARATION OF ALUMINUM NITRIDE
Filed May 23, 1960
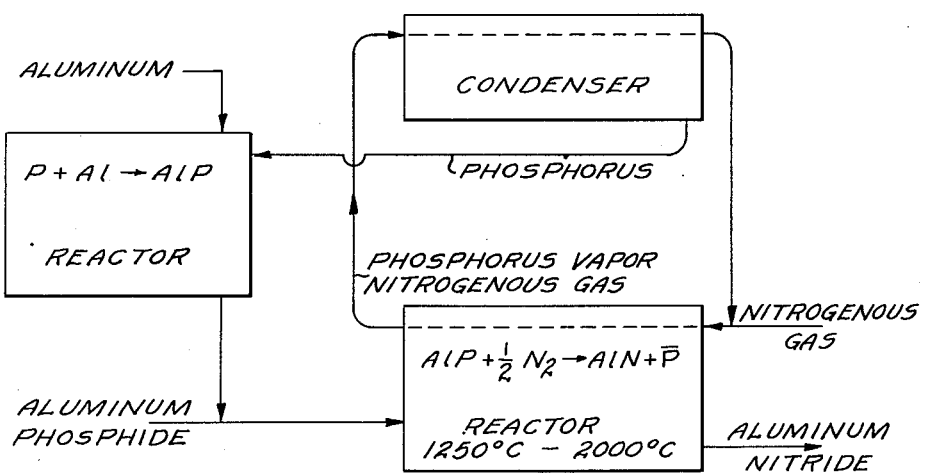
Inventor
Vlado J. Matkovich
by Richard R Mybeck
Attorney

United States Patent Office 3,147,076
Patented Sept. 1, 1964

3,147,076
PREPARATION OF ALUMINUM NITRIDE
Vlado I. Matkovich, Milwaukee, Wis., assignor to Allis-Chalmers Manufacturing Company, Milwaukee, Wis.
Filed May 23, 1960, Ser. No. 31,063
8 Claims. (Cl. 23—192)

The present invention relates to the manufacture of aluminum nitride and has for its prime object the preparation of aluminum nitride having a higher degree of purity and which is less expensive to produce than the aluminum nitride obtained with presently known methods of preparation.

Aluminum nitride is, of course, an extremely useful material and as its properties become better known, interest in a simple and inexpensive method of synthesis is increasing. Of its properties, probably the most important is its excellent resistance to molten metals, particularly aluminum, at temperatures up to about 2000° C. It is also characterized with good thermal shock resistance, good strength and excellent resistance to most chemicals.

Several prior art methods of preparing aluminum nitride are known but all possess several serious disadvantages among which are small yield, expensive procedures and the production of a contaminated product.

One prior art method, as disclosed in U.S. 1,241,834, Duncan, consists of passing nitrogen or producer gas over a mixture of carbon and bauxite (which is already calcined and heated to about 1800–1900° C.) in a revolving electric furnace.

While Duncan achieves some degree of success in producing aluminum nitride, his method presents several difficulties which seriously detract from its commercial practicability. For example, the required manipulation of an electric furnace at Duncan's relatively high temperatures is exceedingly difficult. Further, it is extremely hard to preserve the linings of such electric furnaces employing Duncan's process, and as a result, the furnace requires extensive shutdown time for the replacement of its linings. Still further, the high temperatures Duncan employs frequently leads to a reversal of the chemical reaction unless extreme care is maintained to maintain the temperatures within critical limits.

Other prior methods (see: "Aluminum Nitride, A Refractory for Aluminum to 2000° C.," George Long and L. M. Foster Journal of the American Ceramic Society, vol. 42, No. 2, pp. 52–59), include reacting aluminum powder with nitrogen in an autoclave, burning aluminum powder in a nitrogen-gas stream and reacting aluminum chloride vapors with ammonia. All of these methods suffer from their inability to provide pure aluminum nitride.

Another prior method which achieved some success consists of reacting aluminum powder in a nitrogen atmosphere using a small amount of salt flux as an initiator (the salt apparently lowers the temperature at which the reaction begins by dissolving the protective oxide film from the aluminum). Once started, however, this reaction is extremely difficult to control. Its temperature occasionally rises rapidly to 1800° C. or more because of the exothermic nature of the reaction. Not infrequently, the aluminum powder will melt and drain away to form a regulus in the bottom of the container. Furthermore, to obtain a product which at its best is only about 85 percent pure, the sintered cake has to be hand separated, ground and re-reacted a number of times in this fashion. Aluminum nitride prepared by this method is extremely costly.

Probably the best of the prior art methods, both from purity of product and ease of operation, consists of striking a direct current arc between two high purity aluminum electrodes disposed in a nitrogen atmosphere. The aluminum vaporizes in the arc and the vapors react with the nitrogen to form a hard lump between the electrodes. When the lump grows so that the arc can no longer be sustained, the material is removed and the process is repeated.

As is apparent, however, the electrical power required is quite expensive and the repeated work stoppages to remove the lumps of material from between the electrodes readily sustain the verdict that this process, like the others, is impractical for a commercial operation. Furthermore, experience shows that only about 80 percent of the product is recovered in the form of these highly sintered lumps with the remaining 20 percent being deposited as a fine reactive unclaimable powder on the cold wall of the container.

With the great need for an easy and inexpensive method to produce aluminum nitride so apparent, the present invention provides several marked advantages without obtaining any of the disadvantages which characterized the prior art methods.

Thus, the method of the present invention enables the production of high purity aluminum nitride by a method which permits its production at a moderate temperature which enables a significant reduction of the controls heretofore required and, further, greatly extends the life of furnace linings employed therewith.

The present invention is predicated upon my discovery, as shall hereinafter be described in detail, that high purity relatively inexpensive aluminum nitride can be produced by the strategic nitridation of aluminum phosphide with a nitrogenous gas (no oxygen) at a temperature of 1250–2000° C. and that the nitride can be produced in commercially practicable quantities in the temperature range of about 1375° C. to about 1450° C. thereby permitting the use of standard commercial furnaces.

Accordingly, one of the prime objects of the present invention is to provide a new method of producing aluminum nitride which obviates the limitations upon and dfficulties encountered by the prior art methods.

Another object of the present invention is to provide an improved method for making aluminum nitride which is predicated upon the use of relatively inexpensive materials, and which can operate at a capacity sufficient to fufill a commercial need.

Another object of the present invention is to provide an improved method for producing aluminum nitride which may be operated at a relatively moderate temperature and thereby employ standard commercial furnaces.

Still another object of the present invention is to provide an improved method of forming aluminum nitride which may be operated on a continuous basis in which substantial portions of the raw material not involved directly in the formation of the aluminum nitride may be recovered and reused.

These and still further objects of the present invention as shall hereinafter appear are fulfilled by the present invention in a manner easily discerned from the following detailed description of an exemplary embodiment of the present invention particularly when read in conjunction with the accompanying drawing which shows a schematic flow diagram of one practice of the present invention.

An important aspect of the present invention is the discovery that aluminum phosphide, a cheap material which can be prepared readily by the direct reaction of aluminum with phosphorous (see: "Aluminum Phosphide—Preparation and Composition" by W. E. White and A. H. Bushey, Journal of the American Chemical Society, vol. 66, pp. 1666, 1944), may be directly converted into aluminum nitride by reaction with a nitrogenous gas at a temperature in the range of from about 1250° C. to 2000° C. and more copiously and economically at a temperature of from about 1375° C. to about 1600° C.

In one practice of the present invention, aluminum phosphide is prepared by reacting fine aluminum powder and red phosphorous. The major impurity in such aluminum phosphide is elementary aluminum and possibly some phosphorus as phosphorus pentoxide. If care is taken to prevent contact with oxygen, and particularly with atmospheric moisture, during handling, the presence of aluminum oxide is negligible. The aluminum phosphide, prepared as above or in any other suitable fashion, is placed in a graphite crucible and fired in a stream of a nitrogenous gas, such, for example, as nitrogen, in an induction furnace at temperatures up to 2000° C. Other investigations, indicated below, were conducted by firing samples in a laboratory tube furnace which was heated by silicon carbide elements.

As aluminum nitride forms by the action of the nitrogenous gas upon the aluminum phosphide, free phosphorus is evolved as a vapor which is readily removed in the nitrogen stream to leave pure aluminum nitride in the reaction zone. The phosphorous vapor in the nitrogen stream is drawn by a pump (not shown) into a condenser where phosphorus condenses and the nitrogenous gas does not. The gas is recycled into its feed stream while the condensed phosphorus may then be directed to a suitable reactor where, by a reaction with elemental aluminum, new aluminum phosphide is formed. This aluminum phosphide may then be recycled back into the original reactor vessel for engagement with the nitrogenous atmosphere. In this manner, the continuous process is realized which is schematically illustrated in the drawing.

The minimum temperature at which the reaction is found to occur is 1250° C. At 1250° C., the rate of reaction is slow and only a small amount of aluminum nitride is found in samples which are fired for sixteen hours. The reaction rate is found to increase with temperature. Thus, at 2000° C., the reaction is complete in less than one hour. At 1400° C., the reaction is complete in sixteen hours and since this temperature is within the range of commercially available furnaces, it is considered a suitable temperature for the commercial production of aluminum nitride by the present invention.

The temperature ranges indicated reflect the temperature of the nitrogenous environment in which the reaction occurs.

A summary of the reaction products for various times and temperatures is set forth in Table I, the product analysis being determined by X-ray analysis:

Table I

| Temperature (° C.) | Time (Hours) | Product |
|---|---|---|
| 1,200 | 16 | AlP |
| 1,250 | 16 | AlP—AlN |
| 1,300 | 16 | AlN—AlP |
| 1,395 | 16 | AlN—AlP |
| 1,395 | 66 | AlN |
| 1,400 | 16 | AlN |
| 1,425 | 10 | AlN—AlP |
| 1,425 | 13 | AlN—AlP |
| 1,425 | 16 | AlN |
| 1,600 | 1 | AlN |
| 2,000 | <1 | AlN |

The samples which are obtained at temperatures of 1425° C. or higher are found to contain only slight traces of phosphorus. The reaction under such conditions is considered complete.

In the practice of the present invention, it is found that the purity of the aluminum nitride product is essentially dependent upon the purity of the starting materials. Thus, unlike the prior methods, once raw materials of fine quality are selected, there is no need for vigorous controls during the reaction inasmuch as they have little or no effect.

It should be repeated that aluminum phosphide is reactive with atmospheric moisture to form phosphine and hydrated alumina. Accordingly, care should be exercised during the formation and/or handling of the aluminum phosphide to avoid contact with moist air.

In the preferred practice of the present invention, aluminum phosphide is introduced into a suitable reactor vessel where it encounters a flow of nitrogenous gases and is heated to a temperature of about 1400° C. The aluminum phosphide is maintained in this atmosphere in the reactor vessel until the aluminum phosphide is completely nitrided into aluminum nitride. Throughout the reaction free phosphorous is liberated as a vapor and flows from the vessel in the nitrogen stream. The whole reaction is complete in about sixteen hours. On a continuous basis, the speed of a suitable mechanism such as a traveling grate furnace and the like may be correlated to discharge the aluminum nitride product when it is formed.

If desired, the process can also be run on a "batch" basis by eliminating the recycling.

It is, of course, understood that such modifications and alterations of this present invention as may readily occur to one skilled in the art, once confronted with this disclosure, are intended included within the spirit of the present invention especially as it is defined by the appended claims.

Having now particularly described and ascertained the nature of my said invention and the manner in which it is to be performed, I declare that what I claim is:

1. The method of forming aluminum nitride comprising: reacting aluminum phosphide in a nonoxidizing environment and at a temperature of at least 1250° C. with a nitrogen gas until the reaction is substantially complete.

2. The method of forming aluminum nitride comprising: forming a nonoxidizing environment; introducing aluminum phosphide and a nitrogen containing gas into said environment at a temperature of at least 1250° C.; and maintaining said phosphide and said gas in said environment while nitrogen from said gas substantially converts all of said aluminum phosphide into aluminum nitride.

3. The method of forming aluminum nitride comprising: forming a nonoxidizing environment; introducing aluminum phosphide and nitrogen into said environment in contact with each other at a temperature of at least 1250° C.; and maintaining said phosphide and said nitrogen in said environment until said nitrogen converts substantially all of said aluminum phosphide into aluminum nitride.

4. The method of forming aluminum nitride comprising: heating aluminum phosphide in a nonoxidizing environment to a temperature of at least about 1250° C. in contact with a flow containing nitrogen gas; maintaining said flow until said aluminum phosphide is substantially completely converted to aluminum nitride and phosphorus vapor is dispelled therefrom; directing said phosphorus vapor out of said environment and into contact with additional aluminum to form aluminum phosphide; and directing the newly formed aluminum phosphide into said environment for reaction with said flow of nitrogen.

5. The method of forming aluminum nitride comprising: heating aluminum phosphide in a relatively dry nonoxidizing environment to a temperature of at least about 1250° C. in contact with a flow of nitrogen passing therethrough; maintaining said flow through said environment until the aluminum phosphide is substantially completely converted to aluminum nitride and phosphorus vapor is dispelled therefrom; directing said phosphorus vapor out of said environment into contact with additional aluminum to form aluminum phosphide; and directing the newly formed aluminum phosphide into said environment for reaction with said nitrogen.

6. The method of forming aluminum nitride comprising: forming a nonoxidizing environment; introducing aluminum phosphide and nitrogen gas into said environment in contact with each other at a temperature in the range of 1375° C. to about 1600° C.; and maintaining said phosphide and said nitrogen in said environment until nitrogen from said gas has substantially completely converted said aluminum phosphide into aluminum nitride.

7. The method of preparing aluminum nitride comprising: heating aluminum phosphide in a nonoxidizing environment to a temperature in the range of 1375° C. to about 1600° C. in contact with a flow of nitrogen gas passing therethrough; maintaining said flow of gas through said environment while said aluminum phosphide is substantially completely converted to aluminum nitride by the nitrogen thereof, phosphorus vapor being dispelled therefrom; withdrawing said phosphorus vapor from said environment; directing said phosphorus vapor into contact with additional aluminum to form aluminum phosphide; and directing said newly formed aluminum phosphide into said environment for reaction with said nitrogen.

8. The method of preparing aluminum nitride comprising: forming a nonoxidizing environment; introducing aluminum phosphide into a flow of nitrogen gas through said environment; heating said environment to a temperature in the range of from about 1250° C. to about 2000° C. to react said nitrogen with substantially all of said aluminum phosphide to form aluminum nitride and phosphorus vapor; withdrawing said phosphorus vapor from said environment in said flow of nitrogen; condensing said phosphorus vapor out of said flow; reacting said condensed phosphorus with additional aluminum to form aluminum phosphide; and directing the uncondensed nitrogen and the newly formed aluminum phosphide into said environment in heated contact with each other.

References Cited in the file of this patent
UNITED STATES PATENTS

| | | |
|---|---|---|
| 1,134,414 | Peacock | Apr. 6, 1915 |
| 1,188,769 | Hershman | June 27, 1916 |
| 1,233,926 | Serpek | July 17, 1917 |
| 1,252,649 | Barnett et al. | Jan. 8, 1918 |
| 2,750,268 | Erasmus et al. | June 12, 1956 |

OTHER REFERENCES

Van Wazer: Phosphorus and its Compounds, vol. 1, pages 147–148 (1958), Interscience Publishers, Inc., N.Y.

Mellor: A Comprehensive Treatise on Inorganic and Theoretical Chemistry, vol. 8, pages 841, 845 and 850, Longmans, Green & Co. (1928).